Sept. 23, 1947. A. GREINER 2,427,722
GLASS TUBE HEATING APPARATUS
Filed Feb. 10, 1945

Inventor:
Alfred Greiner,
by John H Anderson
His Attorney.

Patented Sept. 23, 1947

2,427,722

UNITED STATES PATENT OFFICE 2,427,722

GLASS TUBE HEATING APPARATUS

Alfred Greiner, Cleveland Heights, Ohio, assignor to General Electric Company, a corporation of New York Application February 10, 1945, Serial No. 577,229

2 Claims. (Cl. 49—58)

My invention relates, in general, to a heating device for tubular glass articles, and more particularly to a gas fire heating device for uniformly heating a narrow annular zone of tubular glass articles of oval and other noncircular cross-section.

In certain glass tube working operations, such as the cutting or the necking thereof, it is desirable to heat the glass tube uniformly around its circumference at the zone where the tube is to be ultimately cut or necked. Where the tube is of circular cross-section, such uniform circumferential heating may be readily obtained either by rotating the tube about its axis while subjecting it to the heating effect of stationary gas fires, or by rotating the gas fires concentrically around the glass tube while the latter is held stationary. While satisfactory for circular-section glass tubes, such heating arrangements will not produce uniform circumferential heating of glass tubes having a cross-section other than circular, such as oval or elliptical section tubes for instance.

One object of my invention is to provide apparatus for effecting uniform circumferential heating of tubular glass articles.

Another object of my invention is to provide apparatus for effecting uniform circumferential heating of tubular glass articles of oval and other non-circular cross-section.

A feature of the invention is the provision of means for moving the gas fires towards and away from the wall of the glass tube, during relative rotation therebetween, to thereby maintain the gas fires at a constant distance from the tube wall at all times during the heating operation.

Figure 1:
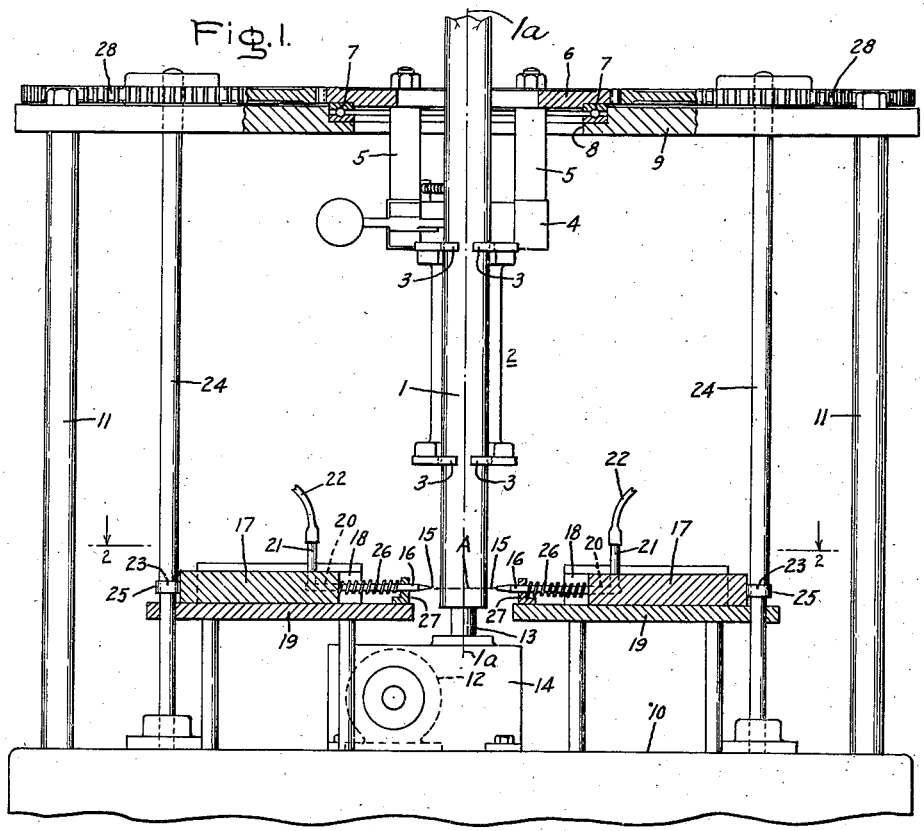
Figure 2:
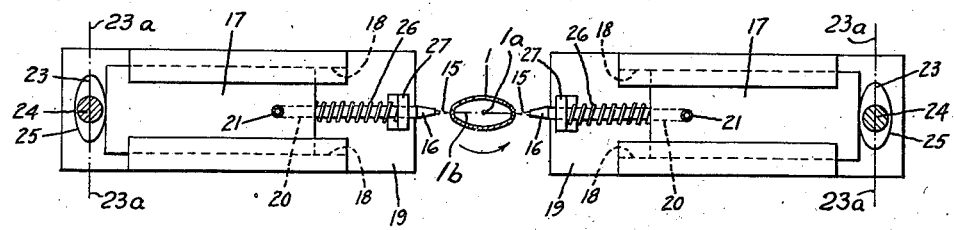

Further objects and advantages of my invention will appear from the following description of a species thereof and from the accompanying drawing in which:

Fig. 1 is an elevation, partly in section, of apparatus comprising my invention for cutting off a length of glass tubing of elliptical cross-section; and Fig. 2 is a horizontal section on the line 2—2 of Fig. 1.

While I have illustrated the invention as applied to apparatus for cutting off a length of glass tubing, it should be understood that the invention may be utilized equally as well for other purposes where uniform circumferential heating of a glass tube is desired, such as the necking or other reshaping of a glass tube, for instance.

Referring to the drawings, the glass tube 1 to be severed is inserted in a rotatable holder 2 comprising two vertically spaced sets of opposed spring-pressed jaws 3 which firmly grip and hold the glass tube 1 in a vertical position. The jaws 3 are pivotally mounted on a holder bracket 4 supported on vertical posts 5 depending from an annular spur gear 6. The jaws 3 hold the glass tube concentric with the gear 6 so that the tube 1 rotates about its own axis 1a when the said gear is rotated.

The gear 6 rests and rotates on a ball bearing 7 mounted on the upper side of, and ringing a circular opening 8 in, a horizontal header or support plate 9. The holder support rods 5 extend up through the opening 8 and are fastened to the annular gear 6. The horizontal plate 9 is supported in an elevated position above a table 10 by means of a plurality of upstanding posts 11 fastened to the table and to the plate.

Rotation of the holder 2 and the glass tube 1 held thereby is produced by an electric motor 12 mounted on the table 10 and driving a vertical shaft 13 through a speed reducer 14 also mounted on the table. The upper end of shaft 13 projects through and is journaled in the support plate 9 and carries a spur gear (not shown) which meshes with the annular gear 6 carrying the glass tube holder 2.

During the rotation of the glass tube 1, a narrow annular zone (along line A) of its exposed lower end is heated by means of sharp pin-point gas fires 15 directed radially thereagainst by a pair of opposed burners 16 movable horizontally towards and away from the rotating tube. The zone of heating of the glass tube 1 is determined by the proper vertical positioning of the tube in the holder 2. The burners 16 are mounted on slides 17 which are slidable in horizontal guideways 18 extending radially of the axis of rotation of the glass tube 1. The guideways 18 are formed in guide blocks 19 supported on the table 10. The burners 16 are connected to a supply of a suitable gaseous combustion admixture, such as oxygen and gas. In the particular case illustrated, the burners 16 are threaded into horizontal bores 20 in the slides 17 which bores are connected by nipples 21 and rubber tubes 22 to the gas and oxygen combustion admixture.

During the rotation and heating of the glass tube 1, the burners 16 are maintained at a constant distance from the wall of the rotating tube (illustrated in the drawings as of elliptical section) by means of rotating edge or disc cams 23 which are mounted on vertical shafts 24 journaled in the support plate 9 and the guide blocks 19. The slides 17 carrying the burners 16 are continuously held against the edges 25 of the cams 23 by the expansive force of compression coil springs 26 fitting over the burners and bearing at one end against the slides 17 and at their other ends against lugs 27 on the guide blocks 19. The contour of the cam edges 25 conform exactly to the cross-sectional outer wall contour of the glass tube 1. The cams 23 are rotated at the same speed as, and in timed relation with the glass tube 1, by means of spur gears 28 mounted on the upper ends of the cam shafts 24 and meshing with the annular gear 6. In the particular case illustrated in the drawings wherein the glass tube 1 and the cams 23 are of elliptical configuration, the angular position of the cams 23 relative to the tube holder 2 is such that their major axes 23a extend at right angles to the major axis 1b of the elliptical glass tube 1 at all times during the rotation of the tube and the cams. Thus, the burners 16 will be advanced to their innermost position when the narrowest portion of the elliptical section tube 1 is presented to the gas fires 15, and retracted to their outermost position when the widest portion of the said tube is presented to the gas fires.

The rotation and heating of the glass tube 1 is continued until the tube wall melts clear through and separates at the annular heating line A, the severed lower end of the tube dropping away of its own weight from the remainder of the tube held in the holder 2.

By maintaining the burners 16 at a uniform distance from the wall of the glass tube 1 at all times during the rotation and heating thereof, the tube will be uniformly heated around its circumference, thus producing a straight and even cut edge where the apparatus is used for tube cutting purposes, or a uniform reshaping of the tube around its circumference where the apparatus is used for tube reshaping purposes.

What I claim as new and desire to secure by Letters Patent of the United States is:

1. Apparatus for heating an annular zone of a glass tube of approximately elliptical cross-section comprising a rotary holder adapted to hold the tube and rotate it about its axis, a gas burner, means slidably mounting said burner to reciprocate it toward and away from the axis of said tube in position to direct a flame normal to the axis of rotation of said tube and at the surface of the tube, a cam having an elliptical surface contour conforming to that of the tube cross-section, means operatively associating the burner slide with said cam surface to cause the burner to be reciprocated upon rotation of the cam, said cam being set at an angular position such that it maintains the burner a constant distance away from the surface of the said tube during rotation, and means for cooperatively rotating the said rotary holder and the said cam at the same speed.

2. Apparatus for heating an annular zone of a glass tube of approximately elliptical cross-section comprising a rotary holder adapted to hold the tube and rotate it about its axis, a gas burner arranged to direct a flame normal to the axis of rotation of said tube and at the surface of the tube, a slide carrying said burner and arranged to move toward and away from the tube, a cam of elliptical surface contour conforming to that of the tube cross-section, means holding said slide against the surface of said cam to cause the slide and burner to be reciprocated upon rotation of the cam, said cam being set with the major axis of its surface at right angles to the major axis of the tube cross-section whereby it maintains the burner at a constant distance away from the surface of the said tube during rotation, and means for cooperatively rotating the said rotary holder and the said cam at the same speed.

ALFRED GREINER.

REFERENCES CITED

The following references are of record in the file of this patent:

UNITED STATES PATENTS

| Number | Name | Date |
|---|---|---|
| 1,314,212 | Quimby et al. | Aug. 26, 1919 |
| 2,371,881 | Dichter | Mar. 20, 1945 |

FOREIGN PATENTS

| Number | Country | Date |
|---|---|---|
| 104,962 | Great Britain | Mar. 29, 1917 |